(12) United States Patent
Wulff

(10) Patent No.: US 8,594,742 B2
(45) Date of Patent: Nov. 26, 2013

(54) SYSTEM AND METHOD FOR MONITORING A MOBILE DEVICE

(75) Inventor: Thomas Wulff, North Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1556 days.

(21) Appl. No.: 11/472,243

(22) Filed: Jun. 21, 2006

(65) Prior Publication Data

US 2007/0298751 A1    Dec. 27, 2007

(51) Int. Cl.
*H04M 1/00*    (2006.01)

(52) U.S. Cl.
USPC ............... 455/569.1; 455/556.1; 455/574

(58) Field of Classification Search
USPC ........ 455/573, 574, 550.1, 556.1, 522, 343.1, 455/569.1
See application file for complete search history.

(56) References Cited

U.S. PATENT DOCUMENTS

| | | | |
|---|---|---|---|
| 3,609,898 A | 10/1971 | Brown | |
| 3,630,476 A | 12/1971 | Lococo | |
| 3,854,685 A | 12/1974 | Parduhn | |
| 4,067,523 A | 1/1978 | Kenny et al. | |
| 4,583,311 A | 4/1986 | Hosey et al. | |
| 4,791,540 A | 12/1988 | Dreyer, Jr. et al. | |
| 4,862,298 A | 8/1989 | Genheimer et al. | |
| 4,883,341 A | 11/1989 | Whitehead | |
| 4,903,172 A | 2/1990 | Schoniger et al. | |
| 4,907,773 A | 3/1990 | Menchetti et al. | |
| 4,947,300 A | 8/1990 | Wen | |
| 4,994,941 A | 2/1991 | Wen | |
| 5,148,153 A | 9/1992 | Haymond | |
| 5,224,770 A | 7/1993 | Simmons et al. | |
| 5,227,929 A | 7/1993 | Comerford | |
| 5,235,472 A | 8/1993 | Smith | |
| 5,276,916 A * | 1/1994 | Pawlish et al. | 455/575.1 |
| 5,373,213 A | 12/1994 | Smith | |
| 5,392,290 A | 2/1995 | Brown et al. | |
| 5,436,838 A | 7/1995 | Miyamori | |

(Continued)

FOREIGN PATENT DOCUMENTS

| | | |
|---|---|---|
| CA | 2447281 A1 | 10/2003 |
| CN | 1278348 A | 12/2000 |

(Continued)

OTHER PUBLICATIONS

Non Final Office Action mailed on Apr. 2, 2009 in U.S. Appl. No. 11/478,963, Thomas Wulff, filed Jun. 28, 2006.

(Continued)

*Primary Examiner* — Christian Hannon
(74) *Attorney, Agent, or Firm* — Randi L. Karpinia; Michael L. Giannetta

(57) ABSTRACT

Described is a system and method for monitoring a mobile device. The device comprises a plurality of sensors and a processor. The sensors detect first data including spatial orientation data and motion data of the device, and the processor compares the first data to second data to determine an occurrence of an event related to at least one of a communications functionality and a power setting of the device. The second data includes predetermined threshold ranges of changes in the spatial orientation data and the motion data. If the event is detected, the processor selects a predetermined procedure for execution as a function of the first data and executes the predetermined procedure.

18 Claims, 4 Drawing Sheets

(56) References Cited

U.S. PATENT DOCUMENTS

| | | |
|---|---|---|
| 5,441,300 A | 8/1995 | Yokota et al. |
| 5,490,411 A | 2/1996 | Hogan |
| 5,521,772 A | 5/1996 | Lee et al. |
| RE35,269 E | 6/1996 | Comerford |
| 5,536,930 A | 7/1996 | Barkan et al. |
| 5,537,270 A | 7/1996 | Morehouse et al. |
| 5,546,687 A | 8/1996 | Iorfida |
| 5,740,471 A | 4/1998 | Terui |
| 5,790,490 A | 8/1998 | Tatsuya et al. |
| 5,835,298 A | 11/1998 | Edgerton |
| 5,842,297 A | 12/1998 | Tung |
| 5,957,564 A | 9/1999 | Bruce et al. |
| 5,982,573 A | 11/1999 | Henze |
| 6,023,869 A | 2/2000 | Durbin |
| 6,024,462 A | 2/2000 | Whitehead |
| 6,052,641 A | 4/2000 | Wuerth et al. |
| 6,076,294 A | 6/2000 | Durbin |
| 6,079,844 A | 6/2000 | Whitehead et al. |
| 6,094,849 A | 8/2000 | Phillips et al. |
| 6,181,380 B1 | 1/2001 | Toyofuku et al. |
| 6,215,409 B1 | 4/2001 | Blach |
| 6,237,883 B1 | 5/2001 | Levin et al. |
| 6,246,862 B1* | 6/2001 | Grivas et al. ............... 455/566 |
| 6,283,375 B1 | 9/2001 | Wilz et al. |
| 6,290,134 B1 | 9/2001 | Rando et al. |
| 6,330,497 B1 | 12/2001 | Obradovich et al. |
| 6,411,828 B1* | 6/2002 | Lands et al. ............. 455/569.1 |
| 6,457,134 B1 | 9/2002 | Lemke et al. |
| 6,508,563 B2 | 1/2003 | Parker et al. |
| 6,539,656 B2 | 4/2003 | Maas et al. |
| 6,570,726 B2 | 5/2003 | Mutoh |
| 6,604,840 B2 | 8/2003 | Watson |
| 6,664,744 B2 | 12/2003 | Dietz |
| 6,676,284 B1 | 1/2004 | Willson |
| 6,707,581 B1 | 3/2004 | Browning |
| 6,846,089 B2 | 1/2005 | Stevenson et al. |
| 6,857,212 B2 | 2/2005 | Velez |
| 6,871,982 B2 | 3/2005 | Holman et al. |
| 6,937,281 B1 | 8/2005 | Ogawa |
| 6,956,564 B1 | 10/2005 | Williams |
| 6,969,034 B2 | 11/2005 | Were et al. |
| 7,024,031 B1 | 4/2006 | Castellanos-Nolasco et al. |
| 7,102,626 B2 | 9/2006 | Denny, III |
| 7,251,094 B2 | 7/2007 | Miyano |
| 7,289,102 B2 | 10/2007 | Hinckley et al. |
| 7,301,529 B2 | 11/2007 | Marvit et al. |
| 7,305,146 B2 | 12/2007 | Cheatle |
| 7,389,933 B2 | 6/2008 | Wang |
| 7,401,300 B2 | 7/2008 | Nurmi |
| 7,432,911 B2 | 10/2008 | Skarine |
| 7,440,847 B2 | 10/2008 | Unuma et al. |
| 7,498,951 B2 | 3/2009 | Wardimon |
| 7,539,576 B2 | 5/2009 | Ohnishi et al. |
| 7,611,061 B2 | 11/2009 | Steele et al. |
| 7,619,686 B2* | 11/2009 | Tom .............................. 348/376 |
| 7,655,331 B2 | 2/2010 | Adams et al. |
| 7,769,542 B2 | 8/2010 | Calvarese et al. |
| 2001/0013854 A1 | 8/2001 | Ogoro |
| 2002/0021278 A1 | 2/2002 | Hinckley et al. |
| 2002/0043561 A1 | 4/2002 | Tsikos et al. |
| 2002/0055861 A1 | 5/2002 | King et al. |
| 2002/0109782 A1 | 8/2002 | Ejima et al. |
| 2002/0111737 A1 | 8/2002 | Hoisko |
| 2002/0165662 A1 | 11/2002 | Maruyama et al. |
| 2002/0186878 A1 | 12/2002 | Hoon et al. |
| 2003/0079387 A1 | 5/2003 | Derose |
| 2003/0093216 A1 | 5/2003 | Akiyama |
| 2003/0105983 A1 | 6/2003 | Brakmo et al. |
| 2003/0122804 A1 | 7/2003 | Yamazaki et al. |
| 2003/0134657 A1* | 7/2003 | Norta et al. .................. 455/550 |
| 2003/0139205 A1 | 7/2003 | Belcher et al. |
| 2003/0144793 A1 | 7/2003 | Melaku et al. |
| 2003/0234797 A1 | 12/2003 | Williams et al. |
| 2003/0234979 A1 | 12/2003 | Poo et al. |
| 2004/0036712 A1 | 2/2004 | Cardno |
| 2004/0193369 A1 | 9/2004 | Kokojima et al. |
| 2004/0201595 A1 | 10/2004 | Manchester |
| 2004/0203897 A1 | 10/2004 | Rogers |
| 2004/0204125 A1 | 10/2004 | Messel et al. |
| 2004/0212586 A1 | 10/2004 | Denny, III |
| 2004/0216343 A1 | 11/2004 | Golding |
| 2004/0226209 A1 | 11/2004 | Ayala |
| 2004/0245334 A1 | 12/2004 | Sikorski et al. |
| 2004/0266480 A1 | 12/2004 | Hjelt et al. |
| 2005/0060088 A1 | 3/2005 | Helal et al. |
| 2005/0072032 A1 | 4/2005 | McCollum et al. |
| 2005/0113124 A1* | 5/2005 | Syrjarinne et al. ............ 455/522 |
| 2005/0127258 A1 | 6/2005 | Lapointe et al. |
| 2005/0154798 A1 | 7/2005 | Nurmi |
| 2005/0175282 A1 | 8/2005 | Wright et al. |
| 2005/0183118 A1 | 8/2005 | Wee et al. |
| 2005/0219552 A1 | 10/2005 | Ackerman et al. |
| 2005/0222801 A1 | 10/2005 | Wulff et al. |
| 2006/0052109 A1 | 3/2006 | Ashman et al. |
| 2006/0114244 A1 | 6/2006 | Saxena et al. |
| 2007/0057067 A1 | 3/2007 | He |
| 2007/0257836 A1 | 11/2007 | Chaplin |

FOREIGN PATENT DOCUMENTS

| | | |
|---|---|---|
| CN | 1869863 A | 11/2006 |
| EP | 0377309 A2 | 7/1990 |
| EP | 0 564 160 | 10/1993 |
| EP | 1355223 A2 | 10/2003 |
| EP | 1617629 A1 | 1/2006 |
| GB | 2310525 A | 8/1997 |
| GB | 2361989 A | 11/2001 |
| GB | 2420620 A | 5/2006 |
| JP | 04-268254 A | 9/1992 |
| JP | 6350895 A | 12/1994 |
| JP | 08-043425 A | 2/1996 |
| JP | 09-134216 A | 5/1997 |
| JP | 09-218446 A | 8/1997 |
| JP | 2000-253141 A | 9/2000 |
| JP | 2002-033793 A | 1/2002 |
| JP | 2002-259066 A | 9/2002 |
| JP | 2002-343074 A | 11/2002 |
| JP | 2005-241331 A | 9/2005 |
| WO | 93/13604 | 7/1993 |
| WO | 9821520 A1 | 5/1998 |
| WO | 9922338 A1 | 5/1999 |
| WO | 9939319 A2 | 8/1999 |
| WO | 0118776 A2 | 3/2001 |
| WO | 0179748 A2 | 10/2001 |
| WO | 2004057595 A1 | 7/2004 |
| WO | 2005/101028 | 10/2005 |
| WO | 2005/103863 | 11/2005 |
| WO | 2006/028514 | 3/2006 |
| WO | 2007016181 A1 | 2/2007 |
| WO | 2007149747 A1 | 12/2007 |

OTHER PUBLICATIONS

International Preliminary Report on Patentability and Written Opinion for International Patent Application No. PCT/US2007/071089 issued on Jan. 6, 2009.

International Search Report and Written Opinion for International Patent Application No. PCT/US2007/071089 issued on Dec. 18, 2007.

Pedestrian Tracking with Shoe-Mounted Inertial Sensors by Eric Foxlin—IEEE Computer Graphics and Applications, Nov./Dec. 2005.

Notice of Allowance mailed on Apr. 5, 2010 in U.S. Appl. No. 11/624,327, Russell Calvarese, filed Jan. 18, 2007.

Non Final Office Action mailed on Oct. 13, 2009 in U.S. Appl. No. 11/624,327, Russell Calvarese, filed Jan. 18, 2007.

Notice of Allowance mailed on Jun. 15, 2009 in U.S. Appl. No. 11/525,488, Michael Steele, filed Sep. 22, 2006.

Non Final Office Action mailed on Dec. 19, 2008 in U.S. Appl. No. 11/525,488, Michael Steele, filed Sep. 22, 2006.

Ex Parte Quayle Action mailed on Jun. 27, 2008 in U.S. Appl. No. 11/525,488, Michael Steele, filed Sep. 22, 2006.

(56) References Cited

OTHER PUBLICATIONS

Office Action mailed on Aug. 7, 2009 in Chinese Patent Application No. 2006800350013.
Office Action mailed on Sep. 1, 2010 in Chinese Patent Application No. 2006800350013.
Office Action mailed on Aug. 23, 2011 in Chinese Patent Application No. 2006800350013.
International Preliminary Report on Patentability and Written Opinion for International Patent Application No. PCT/US2006/029066 issued on Jan. 29, 2008.
International Search Report and Written Opinion for International Patent Application No. PCT/US2006/029066 mailed on Jul. 12, 2006.
Non Final Office Action mailed on Aug. 7, 2008 in U.S. Appl. No. 11/471,979, Michael Iverson, filed Jun. 21, 2006.
International Search Report and Written Opinion for International Patent Application No. PCT/US2007/070979 mailed on Nov. 20, 2007.
International Preliminary Report on Patentability and Written Opinion for International Patent Application No. PCT/US2007/070979 issued on Dec. 22, 2008.
Office Action mailed on Jun. 2, 2011 in Chinese Patent Application No. 200780028587.5.
Office Action mailed on May 11, 2009 in European Patent Application No. 07798429.2.
Office Action mailed on Oct. 5, 2010 in European Patent Application No. 07798429.2.
Final Office Action mailed on Aug. 11, 2009 in U.S. Appl. No. 10/748,992, Steven Moris Sikorski, filed Dec. 29, 2003.
Final Office Action mailed on Jun. 14, 2007 in U.S. Appl. No. 10/748,992, Steven Moris Sikorski, filed Dec. 29, 2003.
Non Final Office Action mailed on Mar. 1, 2007 in U.S. Appl. No. 10/748,992, Steven Moris Sikorski, filed Dec. 29, 2003.
Final Office Action mailed on Sep. 20, 2005 in U.S. Appl. No. 10/748,992, Steven Moris Sikorski, filed Dec. 29, 2003.
Non Final Office Action mailed on Jun. 28, 2005 in U.S. Appl. No. 10/748,992, Steven Moris Sikorski, filed Dec. 29, 2003.
Office Action mailed on Dec. 10, 2009 in Australian Patent Application No. 2005233951.
Office Action mailed on Jan. 7, 2011 in Australian Patent Application No. 2005233951.
Office Action mailed on Nov. 29, 2010 in Canadian Patent Application No. 2562145.
Office Action mailed on Oct. 30, 2009 in Chinese Patent Application No. 200580015277.0.
Office Action mailed on Jun. 2, 2011 in Chinese Patent Application No. 200580015277.0.
Office Action mailed on Jul. 20, 2009 in European Patent Application No. 05733020.1.
Office Action mailed on Jul. 16, 2010 in European Patent Application No. 05733020.1.
Office Action mailed on Aug. 22, 2011 in European Patent Application No. 05733020.1.
Office Action mailed on Nov. 5, 2010 in Japanese Patent Application No. 2007-507376.
Final Office Action mailed on Aug. 1, 2011 in Japanese Patent Application No. 2007-507376.
European Search Report mailed on Aug. 29, 2011 in European Patent Application No. 11174542.8.
European Search Report mailed on Aug. 29, 2011 in European Patent Application No. 11174555.0.
Office Action mailed on Oct. 28, 2011 in Australian Patent Application No. 2011221421.
Miniature MEMS Accelerometer Adds Motin Sensing to Consumer Products, Ashok Bindra, Jun. 26, 2000, 1 sheet.
Coming: MEMS Accelerometers for Motin Detection, Jim Pinto, Aug. 6, 2003, 1 sheet.
MEMS, Stephanie Izarek, Apr. 3, 2001, PC Magazine, 1 sheet.
"Analog Devices Expands Low-G MEMS Portfolio with 3-Axis Accelerometer Technology for Portable Applications, Jan. 31, 2005, Business Wire, 3 sheets".
Accelerometers: Jump into the Consumer Market, Michelle A. Clifford, Aug. 2004, Sensormag.com, 5 sheets.
Supplementary European Search Report mailed on Feb. 2, 2009 in European Patent Application No. 05733020.1.
Final Office Action mailed on Oct. 15, 2008 in U.S. Appl. No. 10/903,225, Thomas Wulff, filed Jul. 30, 2004.
Non Final Office Action mailed on Mar. 17, 2008 in U.S. Appl. No. 10/903,225, Thomas Wulff, filed on Jul. 30, 2004.
International Search Report and Written Opinion for International Patent application No. PCT/US05/10971 mailed on Jun. 24, 2008.
International Preliminary Report on Patentability and Written Opinion for International Patent application No. PCT/US05/10971 issued on Jul. 15, 2008.
Final Office Action mailed on Aug. 24, 2011 in U.S. Appl. No. 12/648,459, Thomas Wulff, filed Dec. 29, 2009.
Non Final Office Action mailed on Dec. 23, 2010 in U.S. Appl. No. 12/648,459, Thomas Wulff, filed Dec. 29, 2009.
Non Final Office Action mailed on Oct. 15, 2012 in U.S. Appl. No. 13/097,287, Thomas Wulff, filed Apr. 29, 2011.
Non Final Office Action mailed on Oct. 12, 2012 in U.S. Appl. No. 13/111,493, Thomas Wulff, filed Apr. 29, 2011.
Notice of Allowance mailed on Sep. 9, 2010 in U.S. Appl. No. 11/190,246, Thomas Wulff, filed Jul. 27, 2005.
Non Final Office Action mailed on Jan. 28, 2010 in U.S. Appl. No. 11/190,246, Thomas Wulff, filed Jul. 27, 2005.
Notice of Allowance mailed on Oct. 8, 2009 in U.S. Appl. No. 11/190,246, Thomas Wulff, filed Jul. 27, 2005.
Notice of Allowance mailed on May 18, 2009 in U.S. Appl. No. 11/190,246, Thomas Wulff, filed Jul. 27, 2005.
Non Final Office Action mailed on Dec. 15, 2008 in U.S. Appl. No. 11/190,246, Thomas Wulff, filed Jul. 27, 2005.
Final Office Action mailed on Aug. 26, 2008 in U.S. Appl. No. 11/190,246, Thomas Wulff, filed Jul. 27, 2005.
Non Final Office Action mailed on Mar. 5, 2008 in U.S. Appl. No. 11/190,246, Thomas Wulff, filed Jul. 27, 2005.

* cited by examiner

SYSTEM AND METHOD FOR MONITORING A MOBILE DEVICE

FIELD OF INVENTION

The present application generally relates to systems and methods for monitoring spatial orientation and motion of a mobile device.

BACKGROUND INFORMATION

Business and individuals today rely on mobile computing products/arrangements ("MCPs", e.g., bar code readers, PDAs, laptops, two-way pagers, mobile phones, digital cameras, mobile optical readers) in a multitude of situations ranging from basic everyday tasks to highly specialized procedures. As the virtues and benefits of utilizing MCPs continue to be realized across increasingly diverse industries, the features and capabilities of these products are expanding at a correspondingly rapid pace. In many industries, MCPs have gone from fashionable accessories to essential business components used by all levels of personnel.

Accordingly, a great need has developed for MCPs to perform complicated tasks quickly, efficiently and reliably. However, as conventional MCPs are fitted with more advanced gadgetry and software features, sacrifices are often made with respect to user-friendliness and operational efficiency. While many methods have been devised attempting to resolve these difficulties, MCPs currently continue to suffer from problems of complicated operational procedures, requiring manual input.

In the ongoing search for solutions to these problems, one aspect of MCPs that has remained overlooked is a product's kinetic state. From an MCP's motions, valuable information may be extracted from which various predetermined procedures may be executed. Therefore, it is desirable to be able to detect, interpret and utilize the movements experienced by MCPs.

SUMMARY OF THE INVENTION

Described is a system and method for monitoring a mobile device. The device comprises a plurality of sensors and a processor. The sensors detect first data including spatial orientation data and motion data of the device, and the processor compares the first data to second data to determine an occurrence of an event related to at least one of a communications functionality and a power setting of the device. The second data includes predetermined threshold ranges of changes in the spatial orientation data and the motion data. If the event is detected, the processor selects a predetermined procedure for execution as a function of the first data and executes the predetermined procedure.

DETAILED DESCRIPTION

Figure 1:
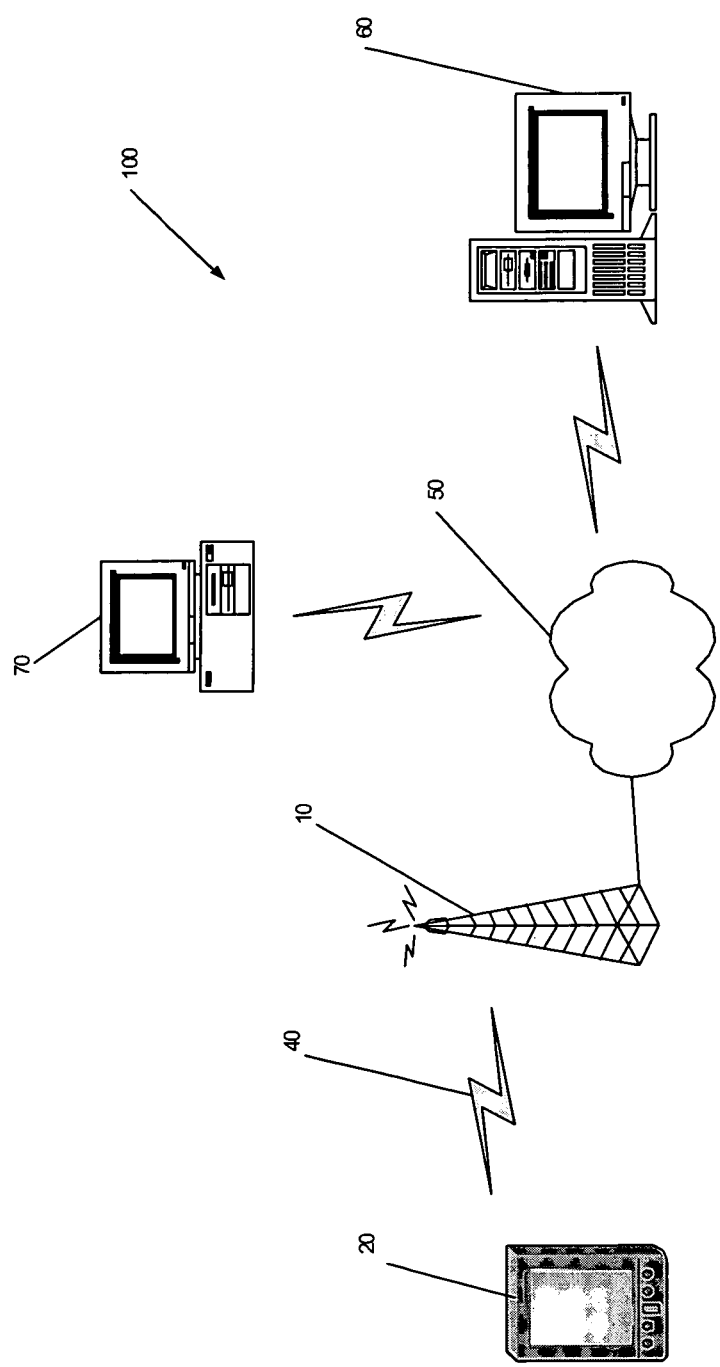
FIG. 1 shows an exemplary embodiment of a mobile network according to the present invention.

The present invention may be further understood with reference to the following description and the appended drawings, wherein like elements are provided with the same reference numerals. The present invention relates to an MCP which includes at least one sensor that monitors the MCP's spatial orientation and motion. In particular, the sensor(s) may measure the MCP's acceleration, velocity, angular velocity/acceleration in any direction, orientation with respect to the user or any other motion to which the MCP may be subjected. These measurements may be contrasted with prerecorded motion patterns or predefined levels of motion. As will be described below, predetermined procedures may then be executed in response to the orientation/motion for adjusting functionality of the MCP.

FIG. 1 shows an exemplary embodiment of a mobile network 100 according to the present invention. In this embodiment, the mobile network 100 may be operating within a Wireless Local Area Network ("WLAN") 40 in an infrastructure mode. The mobile network 100 may also include an access point ("AP") 10, an MCP 20, a communications network 50, a server 60, and a client computer 70. The MCP 20 is situated in a three dimensional reference frame in which it may translate, rotate, pivot, accelerate or otherwise be in motion. Those of skill in the art will understand that the exemplary embodiments of the present invention may be used with any mobile network and that the mobile network 100 is only exemplary.

The WLAN 40 may use a version of the IEEE 802.11 or a similar protocol. One benefit of using a version of the IEEE 802.11 standard is that existing infrastructures using that standard may be adapted to support the system with minimal modifications. With only a simple software upgrade, most MCPs 20 supporting that standard may operate according to the present invention. In alternative exemplary embodiments, different wireless protocols or technologies (e.g., Bluetooth, WWAN, WPAN, infrared, cellular, etc.) may also be utilized.

Referring back to the mobile network 100, the AP 10 may be, for example, a router, switch or bridge that forms the connection between the WLAN 40 and the communications network 50. Coupled to the WLAN 40 is the MCP 20 and coupled to the communications network 50 are the server 60 and the client computer 70. The communications network 50 is utilized to transmit data between the various components of the mobile network 100. This communications network 50 can be any network usable to transmit data, such as between microprocessors, and may be a local area network ("LAN"), a wide area network ("WAN"), a PSTN or the Internet. When the communications network 50 includes the Internet, the range of the MCP 20 can be essentially unlimited, as long as the AP 10 connected to the communications network 50 is within range of the MCP 20. Therefore, the AP 10 does not have to physically be in the vicinity of the server 60 or the client computer 70, as it may be remotely located by extending network cabling or through the Internet.

The MCP 20 may be any type of computer or processor based mobile device which may include a laser-/imager-based scanner, an RFID reader, a PDA, a laptop, a two-way pager, a mobile phone, a digital camera, a portable media player, etc. Since the MCP 20 is portable, it is capable of connecting to a wireless network, and is sufficiently small to be easily carried. The MCP 20 may be designed for specific purposes, such as reading barcodes, or may be a handheld device with different purposes, to which various functionalities have been added through separate software modules. In one exemplary embodiment, the MCP 20 is based on a multi-purpose personal digital assistant ("PDA") such as those running the Microsoft Pocket PC 2003 operating system, or similar.

Figure 2:
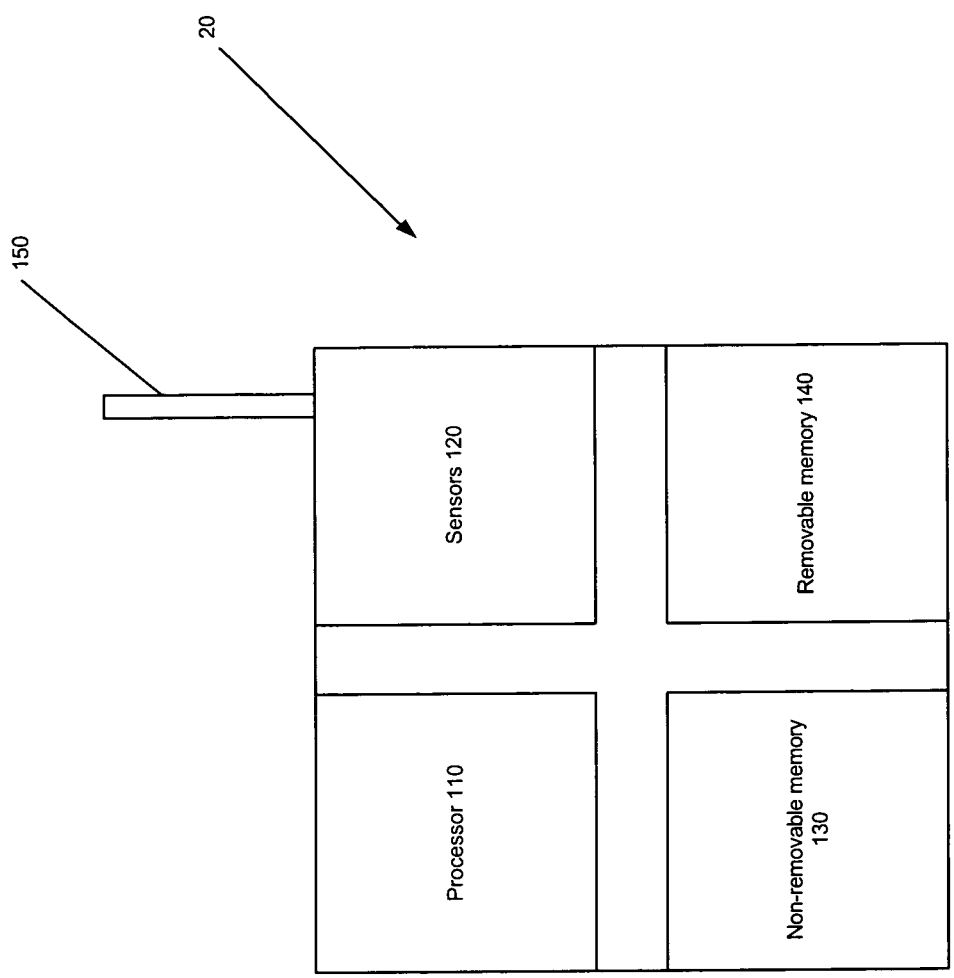
FIG. 2 shows an exemplary embodiment of a mobile computing product/arrangement according to the present invention.

FIG. 2 shows an exemplary embodiment of the MCP 20 according to the present invention. In this embodiment, the MCP 20 may include a processor 110, one or more sensors 120, a non-removable memory 130, a removable memory 140, and an antennae 150. The processor 110 is a central processing unit ("CPU") that executes instructions, e.g., on measurements taken by the sensors 120 and performs procedures corresponding thereto. The non-removable memory 130 is any type of memory component integrated into the electronic architecture of the MCP 20 and may be temporary (e.g., random access memory, or RAM) or permanent (e.g., a hard-disk drive). The removable memory 140 may be any type of detachable memory component that may connect to the MCP 20 through an expansion interface (e.g., a FLASH interface, a USB interface, a firewire interface, etc.).

In the exemplary embodiment of FIG. 2, the sensors 120 may be integrated into the MCP 20. That is, the sensors 120 may be coupled to an electronic architecture of the MCP 20 that dispatches data to a separate memory device, or it may be coupled to at least a portion of another device in the architecture. For instance, in the latter embodiment, the sensors 120 may be coupled to a memory arrangement in which event data (e.g., a first data of an event relating to orientation and movement of the MCP 20 with values above a predetermined threshold) is stored. In an alternative exemplary embodiment, the sensors 120 may be embodied in a separate external device that connects to the MCP 20, 25 through an expansion slot (e.g., a sensor incorporated into a CF card or with a FLASH, USB, firewire or similar interface).

The sensors 120 may be any type of measurement devices capable of monitoring spatial orientation and motion, and may be based on, for example, a G-shock sensor, a switch, an accelerometer, a strain gage, a piezo, MEMS technologies, or combinations of the like. The spatial orientation may include any angular movement with respect to at least one axis in the three-dimensional reference frame of the MCP 20. The motion may include, for example, a velocity value, an acceleration value, an angular acceleration/velocity value, etc. Although the sensors 120 may be of any size, they are preferably small enough so that any added weight and space occupied on the MCP 20 is negligible. Because the MCP 20 usually operates on batteries, the sensors 120 should preferably have a low power consumption. In addition, the sensors 120 should preferably be durable enough to withstand the abusive environments.

The sensors 120 detect changes in the spatial orientation and motion of the MCP 20 and generate the first data. The first data is provided to the processor 110 which compares the first data to predetermined second data which includes threshold ranges and/or values. For example, the second data may be a prerecorded rotation of the MCP 20 by ninety degrees, the detection of which may indicate of the occurrence of an event. The second data may be a threshold range of 90° angle intervals and or a 90° max angle so that when the first data indicates that the MCP 20 has rotated more than 90°, the MCP 20 selects and executes a particular predetermined procedure.

The first data may be retained for each instance where the measurements of the sensors 120 are outside of the threshold ranges or greater than the value, which would be indicative of an event. The processor 110 may also append additional information to the retained first data including sequential numbering of the events, time and date for each event, acceleration data, data corresponding to a status of the MCP 20 at the date/time of the event, environmental factors, etc.

Figure 4A:
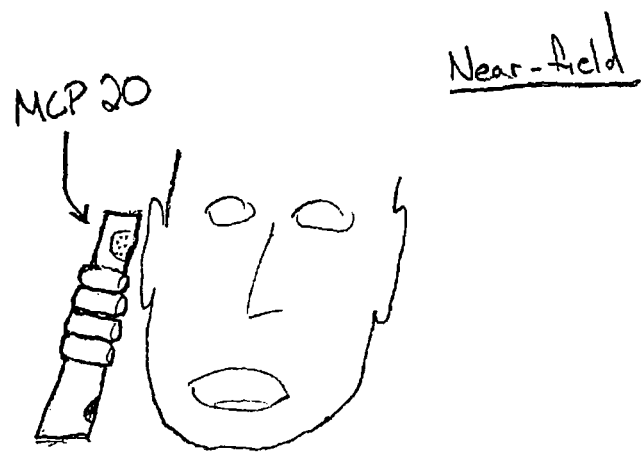
FIG. 4a shows an exemplary embodiment of a mobile computing product/arrangement used in a near-field modality according to the present invention.

In the exemplary embodiment of the present invention, the MCP 20 selectively activates mobile communications capabilities based on a comparison of the first data and the second data. As described above, the MCP 20 may be usable as a mobile phone having full-duplex and/or half-duplex modes. In the full-duplex mode, the MCP 20 may be used as a conventional mobile phone and being held close to the user (as a telephone handset) so that the user can talk and listen simultaneously, as shown in FIG. 4a. Use of the MCP 20 as a telephone handset may be referred to a near-field modality.

Figure 4B:
FIG. 4b shows an exemplary embodiment of a mobile computing product/arrangement used in a far-field modality according to the present invention.

In contrast, the MCP 20 may also be used in the half-duplex mode as a walkie-talkie (e.g., a push-to-talk (PTT) mode). When used as a walkie-talkie, the MCP 20 is typically held at a distance from the user, as shown in FIG. 4b. In this, a far-field modality, the MCP 20 enables a speaker-phone functionality and the PTT so that the user can hear signals from the speaker even at the distance from the MCP 20. Use of the speaker-phone functionality may also include increasing sensitivity of a microphone and/or using signal processing techniques for the user's speech, as is conventionally known.

In the exemplary embodiment of the present invention, the first data generated by the sensors 120 is used by the MCP 20 to switch between the near-field and far-field modalities, as well as activating and deactivating the mobile communications functionality and/or the MCP 20. For example, when the first data is indicative of the MCP 20 being held as the telephone handset, the near-field modality is activated. When the first data is indicative of the MCP 20 being held as the walkie-talkie, the far-field modality is activated (and the near-field modality deactivated). Additionally, the MCP 20 may activate the mobile communications functionality (and, optionally, itself) when the first data indicates the MCP 20 is in use (or the user is holding the MCP 20 for intended use) and deactivate the mobile communications functionality (and, optionally, itself) when the first data indicates non-use (e.g., hooked to a user's belt, at his side, motionless, etc.).

The foregoing embodiments of the mobile network 100 and the MCP 20 are not to be construed so as to limit the present invention in any way. As will be apparent to those skilled in the art, different types of the MCP 20 may be used to communicate over the same data network, as long as they work under compatible protocols.

Figure 3:
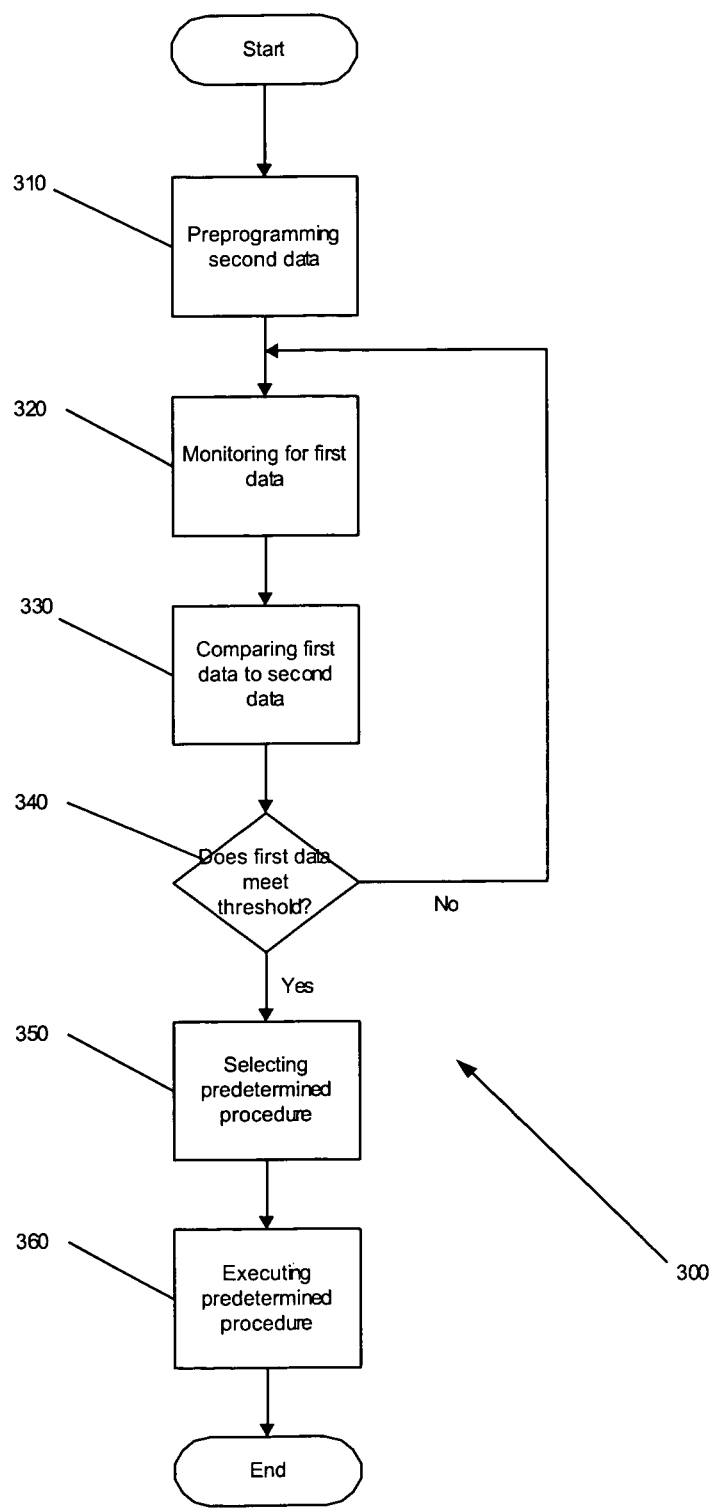
FIG. 3 shows an exemplary embodiment of a method for monitoring a mobile computing product/arrangement according to the present invention.

FIG. 3 shows an exemplary method 300 for monitoring the MCP 20. In the step 310, certain distinct characteristics of events (e.g., the second data) are identified and programmed into the MCP 20. The second data may include a specific threshold value and/or a threshold range of changes in the spatial orientation and motion of the MCP 20. The characteristics may include, for example, maximum or minimum threshold values or prerecorded motions. The user (e.g., the manufacturer, a system administrator or any other authorized person) may designate or, if desired, make changes to these characteristics. For instance, the MCP 20 may be prepackaged by the manufacturer with static maximum values that are inaccessible or not editable by the user. Alternatively, the threshold may simply be dynamic default values adjustable to future specifications. In addition, the second data may include prerecorded movements of the MCP 20, e.g., the MCP 20 being used as a telephone handset and as a walkie-talkie, the MCP 20 hanging from the user's belt, etc.

In the step 320, the sensors 120 continuously monitor the MCP 20 for changes in the spatial orientation and/or motion/movements that may constitute the occurrence of a predefined event. An event may include, for example, the MCP 20 being rotated, lifted, put down, inverted, remaining still for a specified duration, etc. Whenever the MCP 20 experiences detectable motion or an extended lack thereof, the first data is generated. The sensors 120 may make no effort to differentiate between or prioritize directional orientation or motion values, returning all results to the processor 110 for processing.

In the step 330, the processor 110 compares the first data with the second data. If the characteristics of the first data match those of the second data, the processor 110 determines that an event has occurred and a corresponding predetermined procedure needs to be selected. At the occurrence of an event, the processor 110 may also attach to the first data at least one additional data of a time/date of each event, a status of the MCP 20, a direction of the acceleration, environmental data, etc. The additional data may be reviewed and used to further refine the second data. For example, if the MCP 20 does not effectively switch between the near- and far-filed modalities, the second data may be adjusted based on the recorded first data.

Due to practical considerations (e.g., memory limitations and processing power) and because not all event occurrences may be significant, the reporting and recording of all movements of the MCP 20 no matter how minor, although possible, may in some instances be impractical. Movements within predefined ranges may not correspond to any of the predefined events and, thus, have no bearing on applications of the present invention. For example, if the user reorients the MCP 20 to focus a laser-line on a bar code, movements corresponding to the reorientation would not register as one of the predefined events. That is, the reorientation would have no affect on the mobile communications functionality of the MCP 20. Therefore, in the step 340, the first data is measured against the threshold values/ranges contained in the second data. The first data may only be retained when at least one event and/or reading satisfies the threshold values/ranges or matches the prerecorded motions of the second data. Otherwise, the first data may be discarded and the method 300 is returned to the step 320 for the monitoring of new events.

If the first data corresponds to one of the events indicated by the second data, the method 300 continues to the step 350 where the processor 110 selects, as a function of the first data, at least one predetermined procedure for execution. In particular, the processor 110 analyzes the first data and determines the corresponding procedure of the plurality of predetermined procedures. In the exemplary embodiment, the plurality of predetermined procedures may include, but is not limited to, activating/de-activating the near- or far-field modality, activating/de-activating the mobile communications functionality of the MCP 20, activating/de-activating the MCP 20 itself, adjusting power settings of the mobile communications components of the MCP 20 (e.g., entering power-save or wake mode), etc.

In the step 360, the predetermined procedure is executed. For example, when the first data indicates that the MCP 20 is being held as a telephone handset, the MCP 20 may activate the mobile communications functionality and the near-field modality. When the first data indicates that the MCP 20 is held at the user's side, the MCP 20 may de-activate the mobile communications functionality and/or itself.

From the description of the exemplary embodiments of the present invention, one of skill in the art would understand that the sensors 120 allow the MCP 20 to enable/disable particular functionality automatically based on movement of the MCP 20. For example, if the MCP 20 indicates that there is an incoming call, instead of pushing a button to accept the call, the user may simply raise the MCP 20 to his ear (like a telephone handset). Upon sensing that motion, the MCP 20 may enable the near-field modality, accepting the call. Similarly, pulling the MCP 20 away from his ear may end the call.

The present invention has been described with the reference to the above exemplary embodiments. One skilled in the art would understand that the present invention may also be successfully implemented if modified. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A mobile computing device, comprising:
   a sensor detecting first data including spatial orientation data of the mobile computing device, the sensor being removably coupled to the mobile computing device; and
   a processor comparing the first data to second data to determine an occurrence of an event related to a communications functionality of the device, the second data including predetermined threshold ranges of changes in the spatial orientation data,
   wherein if the event occurrence is detected, the processor activates a communication mode of the device as a function of the comparing, further wherein the communication mode is one of a near-field communication mode in which the communications functionality operates in a full-duplex mode and a far-field communication mode in which the communications functionality operates in a half-duplex mode.

2. The device according to claim 1, wherein the communications functionality is activated in the near-field mode when the first data indicates that an orientation of the device corresponds to a pre-identified telephone handset orientation.

3. The device according to claim 1, wherein the spatial orientation data includes at least one angular movement value of the arrangement with respect to at least one axis of the device.

4. The device according to claim 1, wherein the sensor includes at least one of a G-shock sensor, a switch sensor, an accelerometer, a strain gage, a piezo and a micro-electromechanical sensor (MEMS).

5. The device according to claim 1, wherein the communications functionality is activated in the far-field mode when the first data indicates that an orientation of the device corresponds to a pre-identified walkie-talkie orientation.

6. A mobile computing device, comprising:
   a sensor detecting first data including spatial orientation data of the mobile computing device, the sensor being removably coupled to the mobile computing device; and
   a processor comparing the first data to second data to determine an occurrence of an event related to a communications functionality of the device, the second data including predetermined threshold ranges of changes in the spatial orientation data,
   wherein if the event occurrence is detected, the processor activates a communication mode of the device as a function of the comparing, further wherein the communication mode is one of a near-field communication mode and a far-field communication mode, wherein the communications functionality is activated in the far-field mode when the first data indicates that an orientation of the device corresponds to a pre-identified walkie-talkie orientation.

7. A method, comprising the steps of:
- detecting, using a sensor removably coupled to a device, first data including spatial orientation data of the device; and
- comparing the first data to second data to detect an occurrence of an event corresponding to a communications functionality of the device, the second data including predetermined threshold ranges of changes in the spatial orientation data;
- if the event occurrence is detected, activating a communication mode of the device as a function of the comparing, wherein the communication mode is one of a near-field communication mode in which the communications functionality operates in a full-duplex mode and a far-field communication mode in which the communications functionality operates in a half-duplex mode.

8. The method according to claim 7, wherein the device is activated in the near-field mode when the first data indicates that an orientation of the device corresponds to a pre-identified telephone handset orientation.

9. The method according to claim 7, wherein the sensor includes at least one of a G-shock sensor, a switch sensor, an accelerometer, a strain gage, a piezo and a micro-electromechanical sensor (MEMS).

10. The method according to claim 7, wherein the communications functionality is activated in the far-field mode when the first data indicates that an orientation of the device corresponds to a pre-identified walkie-talkie orientation.

11. A method, comprising the steps of:
- detecting, using a sensor removably coupled to a device, first data including spatial orientation data of the device;
- comparing the first data to second data to detect an occurrence of an event corresponding to a communications functionality of the device, the second data including predetermined threshold ranges of changes in the spatial orientation data;
- if the event occurrence is detected, activating a communication mode of the device as a function of the comparing, wherein the communication mode is one of a near-field communication mode and a far-field communication mode;
- detecting third data from the sensor for a plurality of predefined spatial orientations of the device, the predefined spatial orientations indicative of a plurality of events; and
- storing the third data in a memory of the device as the second data.

12. The method according to claim 11, wherein, when in the near-field mode, the device operates in a full-duplex mode, and, when in the far-field mode, the device operates in a half-duplex mode.

13. The method according to claim 11, wherein the device is activated in the near-field mode when the first data indicates that an orientation of the device corresponds to a pre-identified telephone handset orientation.

14. The method according to claim 11, wherein the communications functionality is activated in the far-field mode when the first data indicates that an orientation of the device corresponds to a pre-identified walkie-talkie orientation.

15. A method, comprising the steps of:
- detecting, using a sensor removably coupled to a device, first data including spatial orientation data of the device; and
- comparing the first data to second data to detect an occurrence of an event corresponding to a communications functionality of the device, the second data including predetermined threshold ranges of changes in the spatial orientation data;
- if the event occurrence is detected, activating a communication mode of the device as a function of the comparing, wherein the communication mode is one of a near-field communication mode and a far-field communication mode, wherein the device is activated in the far-field mode when the first data indicates that an orientation of the device corresponds to a pre-identified walkie-talkie orientation.

16. The method according to claim 15, wherein the device is activated in the near-field mode when the first data indicates that an orientation of the device corresponds to a pre-identified telephone handset orientation.

17. A device, comprising:
- a sensing means for detecting first data of an event including spatial orientation data of the device, the sensing means being removably coupled to the device; and
- a processing means for comparing the first data to second data to detect an occurrence of an event corresponding to a communications functionality to be executed, the second data including predetermined threshold ranges of changes in the spatial orientation data,
- wherein if the event is detected, the processing means activates a communication mode of the device as a function of the comparing, further wherein the communication mode is one of a near-field communication mode and a far-field communication mode,
- wherein the device is activated in the far-field mode when the first data indicates that an orientation of the device corresponds to a pre-identified walkie-talkie orientation.

18. The device according to claim 17, wherein the device is activated in the near-field mode when the first data indicates that an orientation of the device corresponds to a pre-identified telephone handset orientation.

* * * * *